Sept. 16, 1958  G. S. HAMBERG ET AL  2,852,017
HEATING APPARATUS
Filed Feb. 6, 1956  2 Sheets-Sheet 2
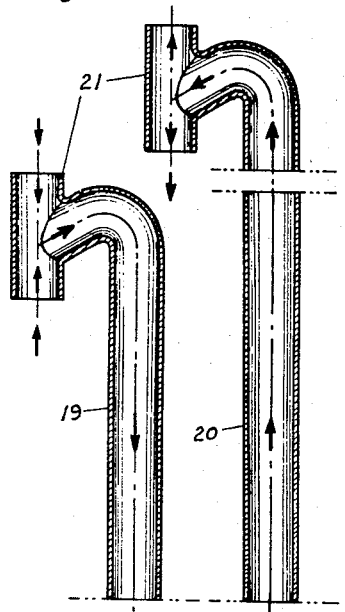
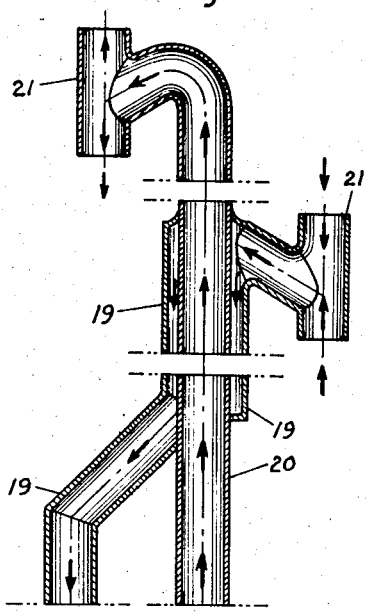
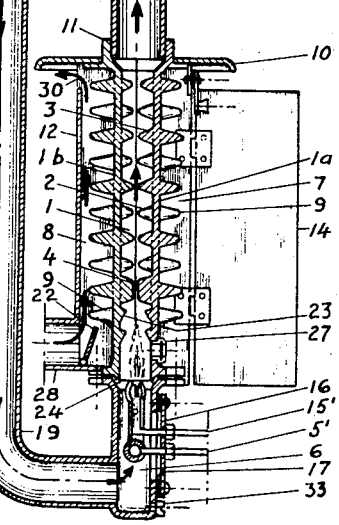
INVENTORS:-
GUSTAV SETH HAMBERG
Odd GUNNAR AUGUST LIDEN
BY: Chatwick & Company
ATTYS.

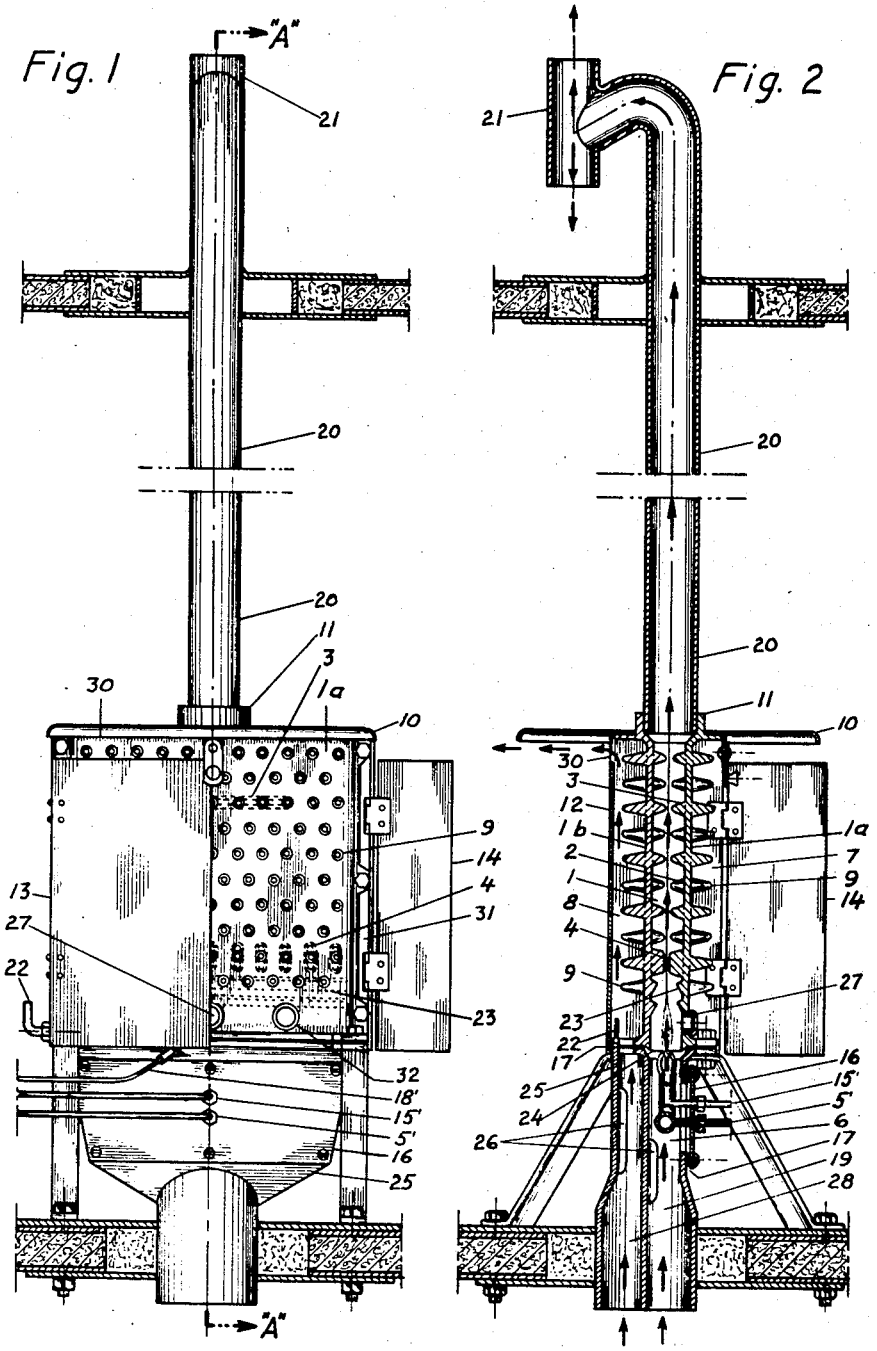

2,852,017
Patented Sept. 16, 1958

2,852,017

HEATING APPARATUS

Gustav Seth Hamberg, Stockholm, and Odd Gunnar August Lidén, Johanneshov, Sweden; said Hamberg assignor to said Lidén Application February 6, 1956, Serial No. 563,787

4 Claims. (Cl. 126—90)

The present invention generally relates to heating apparatus and more particularly to combined hot air and radiant heaters.

The primary object of the invention is to provide a heating apparatus of the kind referred to which is particularly adapted for use in tents, worker-vans, busses, huts, barracks, cottages, boats, and other localities where, in comparison to the volumetric air-space of such localities, many people are to be housed.

The invention also has for an object to provide a heating apparatus of the kind referred to which is suitable for use at places where the presence of dry air is required, use as, for instance, where moisture-sensitive equipment and the like is stored or used, such as at dial central offices, or at working places in the field, for instance in cable-joining tents and in cable manholes where, in addition, it may be required to dry the cable-joint using hot and dry air.

A further object of the invention is to provide a heating apparatus of the kind indicated which is adapted for use in garages, greenhouses and like localities.

In association with these objects, a subsidiary object of the invention is to provide a heating apparatus of the kind referred to which, besides a sufficient amount of heat, will deliver a continuous supply of pre-heated fresh-air at a rate which should be adjustable in a calorifically economical manner to thereby obtain an agreeable atmosphere, and also being efficient in drying wet clothes, instruments, etc. As a matter of fact, the rate of supply of pre-heated fresh air required for drying purposes is greater during the hot season when the relative humidity is frequently comparatively high, than during the cold season when, as a rule, the same is low.

A still further object of the invention is to provide a heating apparatus of the kind referred to in which all requisite air is induced directly from the external atmosphere, and in which all the gases of combustion are vented directly to the external atmosphere whereby the air present within the locality will not be consumed, nor mixed up with gases of combustion.

A still further object is to provide a heating apparatus of the kind referred to which will function perfectly when operating in moving craft such as boats or vans, and also under severe weather conditions or in heavy seas where otherwise the burner of the apparatus would tend to get extinguished by a gust of wind or by intruding water. A specific object of the invention is to prevent such malfunctioning and, at the same time, to impart to the heating apparatus a stable draft effect and to enable one single opening to be made in a roof, deck or the like for the induction of air and for exhausting gases of combustion through a chimney affording two passages for the air and gases, respectively.

The heating apparatus of the present invention is so devised and constructed as to satisfy all the objects stated hereinbefore, and, in addition, so as to be readily provided with a safety device adapted automatically to cut off the fuel-supply should the burner get extinguished for some reason or other, and also with a thermostatic device adapted automatically to control the fuel-supply so as to maintain constantly a desired room-temperature.

According to the present invention, a combined hot air and radiant heater comprises a combustion chamber open at its upper and lower ends and having two opposite walls serving as heat transfer walls, a burner chamber connected at its open upper end to the lower end of the combustion chamber and serving as an inlet for combustion air to the combustion chamber, a burner mounted on the burner chamber and arranged to direct flames into the combustion chamber, a flue mounted on the upper end of the combustion chamber as an outlet for combustion gases, heat-absorbing projections provided on the inside of the heat-transfer walls in the path of the flame and combustion gases, an external casing surrounding the combustion chamber and having a first wall spaced from one heat-transfer wall of the combustion chamber to define therewith a first passage open at top and bottom for movement of convected air, heat radiating and conducting projections on said transfer wall extending into said first passage to heat the air passing therethrough by convection, a second wall of the casing formed by two doors carried on vertical hinges at the side edges thereof, said doors forming in closed position a wall spaced from the other transfer wall of the combustion chamber and defining therewith a second passage open at top and bottom for convection air, heat radiating and conducting projections on said other transfer wall extending into said second passage to heat air passing therethrough by convection and also to radiate heat to the surroundings in accordance with the extent of opening of the doors, and a horizontal hot plate mounted on and surrounding the upper open end of the combustion chamber and spaced above the upper end of the first and second walls of the casing to deflect hot air issuing from the first and second passages and thereby become heated, the amount of heating imparted to the hot plate by the air passing through the second passage being in accordance with the extent of opening of the doors.

A few embodiments of the invention will now be described by way of example, reference being had to the accompanying drawings in which:

Fig. 1 is a front-elevational view of a preferred embodiment of the present invention.

Fig. 2 is a vertical central section through the apparatus shown in Fig. 1 and taken at right angles to the plane of Fig. 1.

Fig. 3 is a section corresponding to that of Fig. 2 through the lower portion of the heating apparatus only and showing a modification thereof which is particularly adapted for use in tents, barracks and like localities where the fresh-air supply for the heaters is induced through a duct extending along the ground or floor.

Fig. 4 is a section similarly corresponding to that of Fig. 2 through the lower portion of a heating apparatus according to a further embodiment of the invention having means for balancing the draft as well as a separate air intake 28 which is, in the embodiment illustrated, connected to the high-pressure side of a ventilating system.

Fig. 5 is a section corresponding to that of Fig. 4 and illustrates another embodiment exemplifying the balanced-draft design where the fresh-air intake 29 surrounds the flue 20 along a part of its length.

Fig. 6 is a front view of the burners.

Referring now to the drawings more specifically, the apparatus illustrated therein comprises a combustion chamber 1 having two spaced vertical walls which are generally flat and are provided on their internal surfaces with heat-absorbing projections 2, ribs 3, 4 or the like. One or more burner devices 5 for burning gaseous or atomized fuel are mounted in a closed burner chamber 6 below the combustion chamber 1 and being adapted to discharge fuel upwardly into the combustion chamber 1. The radiation from the heating apparatus takes place mainly in two opposite directions, viz. at right angles to said two opposite heat-transfer side-walls of the combustion chamber 1, these walls being also provided with exernal projections 9, the latter usually affording a considerably larger heat-transferring area than the internal projections 2, 3 or 4 within the combustion chamber 1.

The combustion chamber 1 is provided at its upper end with a hot-plate 10 as well as with a central outlet connection 11 into which the flue 20 is to be fitted. The combustion chamber 1 is further provided with an external casing 12 which is generally box-shaped having front and rear walls in spaced relation to adjacent ones of said heat-transferring walls of the combustion chamber 1 and forming air passages therebetween. The lateral walls of this casing 12 close the combustion chamber 1 laterally. The space between the front wall of the casing 12 and the adjacent wall of the combustion chamber 1 is adapted to function as a stove compartment 7 for which purpose this front wall is provided with two hinged doors 13, 14 which are openable as desired to adjust the degree of direct radiation from the stove compartment 7. The front and rear walls of the casing 12 terminate in spaced relation to the underside of the hot-plate 10 in order to form front and rear outlets, respectively, for continuous flows of air from within the casing to the ambient space. The lateral end walls of the casing, however terminate close to the underside of the hot-plate 10. The casing may, to advantage, be made of sheet-aluminum. When the doors 13, 14 are closed, air from the room will be circulated through the stove compartment 7 into which it enters through an inlet opening in the bottom of the stove 7, is heated while passing upwardly over the adjacent combustion chamber wall, and is expelled through the exit opening above the doors 13, 14 giving up heat to the hot-plate 10. When the doors 13, 14 are open a directional radiation of heat will take place, especially toward the lower part of the room. When the doors are closed the hot-plate 10 will become very hot, the heating of the plate being, however, comparatively low when the doors 13, 14 are open. Thus the heat radiation of the stove 7 and the heating of the hot-plate 10 are differentially adjustable by opening and closing the doors 13, 14 more or less or completely. The control of the heat supplied to the hot-plate 10 by adjusting the doors 13, 14 provides a means for controlling the heat supplied to food cans, vessels, washing water or the like which may be placed on the upper surface of the hot plate 10.

The space formed between the rear wall of the casing 12 and the adjacent rear wall of the combustion chamber 1 is adapted to function as an air-heating compartment 8 in that atmospheric air is induced through the bottom end of said space, is heated by passing upwardly over the rear wall of the combustion chamber 1 toward the underside of the hot-plate 10 giving up part of its heat content to this plate, and is then expelled through the exit opening between the upper end of the rear casing wall and the underside of the hot-plate 10 in order to heat and substitute the air in the locality in which the heating apparatus is installed.

The combustion chamber walls are provided in the flame zone of the chamber 1 with inwardly projecting horizontally extending ribs or the like 23 which will be exposed to a strong heating effect from the burner or burners 5. Any condensation water formed in the flame zone will therefore evaporate when passing these ribs so that the combustion will not be interfered with by such condensation water. The combustion chamber 1 is also provided with a water-deflecting lip 24 extending horizontally along the lower edge of the combustion chamber and depending beyond the plane in which the latter is jointed with the bottom part 25 of the heating apparatus thus preventing any moisture from penetrating into the joint when the heating apparatus is not in use. Moisture retained in this joint might cause bursting at freezing temperatures.

The heat absorbing projections as well as the heat-radiating projections of the combustion chamber walls are so disposed as to cause radiation to occur in two opposite principal directions, viz. forwardly and rearwardly from the heating apparatus. The two lateral end surfaces of the heating apparatus will not get very hot and thus may safely be disposed in rather close proximity to a wooden wall of the locality.

Centrally near the bottom end of the front wall of the combustion chamber 1 a lighting 27 device in the form of, for instance, a scratch lighter is provided opposite a pilot burner (not shown) to which a pilot fuel pipe 15' is connected leading from a safety-lighting device (not shown). The pilot flame is arranged to heat a heat-sensitive element 18 which is, as well as the fuel pipe 5' of the main burner 5, connected to the safety-lighting device so as to cause fuel to be supplied to the main burner 5 only when the pilot burner is operating. If no thermostat is used for controlling the room temperature, then the fuel-supply pipe 5' leading to the main burner or burners 5 is connected directly to the said safety-lighting device but if such a thermostat is used it would usually be inserted between the safety-lighting device and the main burner or burners.

The operation of the heating apparatus illustrated in Figs. 1 and 2 is as follows:

The pilot burner 15 connected to fuel-pipe 15' is lighted by actuating the lighting device 27, being for instance a fixed scratch-lighter. The pilot burner flame will heat the heat-sensitive element 18. The latter, when hot, operates to keep open the through-passage for the gaseous fuel through the safety-lighting device so that fuel will be supplied to the main burner 5 which is lighted by the pilot burner connected to pilot fuel pipe 15'. The combustion air required for the burners enters the burner chamber 19 from below, being induced from underneath the floor. The gases of combustion escape through the flue 20 which is provided with a special wind trap 21 as shown in Fig. 1 serving to prevent the burners from getting extinguished by gusts of wind or by water or snow penetrating into the flue from above.

If the heating apparatus is equipped with a thermostat the supply of fuel to the burners 5 will be automatically controlled in the conventional manner to obtain a steady room temperature corresponding to the setting of the thermostat.

Owing to the combination described, and also due to the fact that, compared to its size, the heating apparatus of the invention is capable of a considerable overall maximum heat output the heating effect of the apparatus may be varied within a wide range. The air heating compartment of the apparatus receives its operating air directly from the open atmosphere outside the locality in which the apparatus is installed, the rate of supply of this air being controllable by a damper 22 adjustably departing from two principal positions, viz. one for the hot season (full open), and one for the cold season (half open).

The embodiment illustrated in Fig. 3 only differs from the one already described in conjunction with Figs. 1 and 2 in that the air inlet duct 25 for the stove and air-heating sections is adapted to extend along the floor or ground surface instead of being passed through the floor of the locality. The operation of this apparatus is identical with the operation of the first embodiment as already described.

Referring now to the embodiments illustrated in Figs. 4 and 5, the operation of these heating apparatus is as follows:

The pilot burner may be lighted by actuating the lighting device 27, or through the lighting hole which may be kept open for a short while, if necessary to afford sufficient time for the convection draft to start up and settle. Then the lighting hole is to be closed by means of a fireproof window. The convection draft set up through the flue 20 results in fresh air being induced downwardly through the single air inlet 29 to the burner chamber. The air inlet 29 is provided with a wind trap 21 identical with that of the flue 20. The flue 20 terminates at a higher level than does the air inlet duct 29. The difference between the two levels determines the pressure head affording the draft necessary for the operation of the heating apparatus and this difference, therefore, should be adjusted to a value which ensures the proper supply of fresh air to make the burners operate satisfactorily and at a favorable efficiency. Since the two wind traps are identical in shape and dimensions the draft will be well balanced under all operating conditions.

In the embodiment illustrated in Fig. 4 the air inlet duct 29 is separate from the flue 20. This arrangement is suitable for use in water-craft, cable manholes and in dangerous localities such as garages where it is of particular importance that the heating apparatus be completely void of any possible leakage from the combustion chamber system to the air-space of the locality. A fixed scratch-lighter should be used to get safe lighting.

Fig. 5 illustrates a further embodiment of the invention. This modification is particularly suitable for use in water-craft. The air inlet duct 29 along part of its length surrounds the flue 20. This enables one single opening to be made in the cabin roof or deck to pass the two ducts therethrough. Further advantages reside in that the opening in the roof or deck need not be provided with any highly efficient heat-insulation owing to the cooling effect of the fresh air flowing down the inlet duct, and in that the inlet air will become pre-heated by the flue 20. At the same time, the gases of combustion flowing up the flue will be cooled, which is a further advantage of this arrangement. When the temperature of the flue gases is high, the pre-heating of the inlet air will occur at a higher rate, too. Thus the temperature difference between the inlet air and the flue gases will be maintained comparatively steady, resulting in a practically constant rate of inlet airflow substantially proportional to the draft head, i. e. the level difference between the inlet and outlet opening. Owing to the wind trap terminating pieces 21 being identical in size and shape external conditions will not interfere with the balanced draft condition, resulting in a high and uniform overall efficiency for the heating apparatus of the invention.

It should be understood that the embodiments hereinbefore described are to be considered as examples illustrative of the invention and to which the invention is by no means restricted. Thus, for instance, the heating apparatus may be shaped in other ways than that illustrated, its component parts may be varied, and re-arranged relative to each other, and the supplementary or auxiliary equipment may be varied, for instance the safety pilot lighting device or the thermostat. The air inlet duct and flue terminal pieces may be designed in any suitable other manner than that illustrated. Any and all such variations or modifications are intended to be possible without departing from the scope of the invention as defined in and by the appended claims.

We claim:

1. A combined hot air and radiant heater comprising a combustion chamber open at its upper and lower ends and having two opposite walls serving as heat transfer walls, a burner chamber connected at its open upper end to the lower end of the combustion chamber and serving as an inlet for combustion air to the combustion chamber, a burner mounted on the burner chamber and arranged to direct flames into the combustion chamber, a flue mounted on the upper end of the combustion chamber as an outlet for combustion gases, heat-absorbing projections provided on the inside of the heat-transfer walls in the path of the flame and combustion gases, an external casing surrounding the combustion chamber and having a first wall spaced from one heat-transfer wall of the combustion chamber to define therewith a first passage open at top and bottom for movement of convected air, heat radiating and conducting projections on said transfer wall extending into said first passage to heat the air passing therethrough by convection, a second wall of the casing formed by two doors carried on vertical hinges at the side edges thereof, said doors forming in closed position a wall spaced from the other transfer wall of the combustion chamber and defining therewith a second passage open at top and bottom for convection air, heat radiating and conducting projections on said other transfer wall extending into said second passage to heat air passing therethrough by convection and also to radiate heat to the surroundings in accordance with the extent of opening of the doors, and a horizontal hot plate having an upper surface adapted to support vessels to be heated, said plate being mounted on and surrounding the upper open end of the combustion chamber and spaced above the upper end of the first and second walls of the casing to deflect hot air issuing from the first and second passages and thereby become heated, the amount of heating imparted to the hot plate by the air passing through the second passage being in accordance with the extent of opening of the doors.

2. A combined hot air and radiant heater, as claimed in claim 1, comprising horizontal ribs on the internal face of the two heat transfer walls of the combustion chamber, said ribs being positioned with respect to the burner so as to be directly over the flames thereof and be strongly heated, whereby to vaporize any condensation water present.

3. A combined hot air and radiant heater, as claimed in claim 1, wherein the combustion chamber and burner chamber are separate members united at a joint, the lower end of the combustion chamber being provided with a lip extending into the burner chamber to deflect water away from said joint.

4. A combined hot air and radiant heater, as claimed in claim 1, including an adjustable damper disposed in the lower end of the casing at the lower end of the first passage, thereby to permit control of the convection air current through said passage.

References Cited in the file of this patent

UNITED STATES PATENTS

| 801,244 | Hughes | Oct. 10, 1905 |
| 940,445 | Elder | Nov. 16, 1909 |
| 1,576,086 | Browne | Mar. 9, 1926 |
| 1,681,476 | Germer | Aug. 21, 1928 |
| 1,695,079 | Barnhart | Dec. 11, 1928 |
| 2,021,581 | Pickup | Nov. 19, 1935 |
| 2,163,928 | Andrews | June 27, 1939 |
| 2,196,828 | Hess | Apr. 9, 1940 |
| 2,632,435 | Lundstrum | Mar. 24, 1953 |

FOREIGN PATENTS

| 180,810 | France | June 11, 1887 |
| 504,705 | France | July 13, 1920 |
| 646 | Great Britain | of 1872 |
| 723,437 | Great Britain | Feb. 9, 1955 |